United States Patent Office.

ALFRED GEORGE WASS, OF GREENWICH, ASSIGNOR TO THE CARBONIZING SYNDICATE, (LIMITED,) OF LONDON, ENGLAND.

BLACK PIGMENT.

SPECIFICATION forming part of Letters Patent No. 419,163, dated January 7, 1890.

Application filed July 24, 1888. Serial No. 280,943. (Specimens.) Patented in England August 4, 1886, No. 9,992; in Belgium September 15, 1886, No. 74,384, and in France December 21, 1886, No. 178,141.

*To all whom it may concern:*

Be it known that I, ALFRED GEORGE WASS, engineer, a subject of the Queen of Great Britain, and resident of Greenwich, England, have invented new and useful Improvements in Carbon or Char, (for which I have obtained patents in the following countries: Great Britain, No. 9,992, August 4, 1886; France, No. 178,141, December 21, 1886, and Belgium, No. 74,384, (B,) September 15, 1886,) of which the following is a specification.

My invention consists of a charred substance, which, for practical commercial purposes, may be and is characterized as a "carbon" or "char," as is hereinafter fully described and claimed.

In carrying out my invention I take the calcareous or earthy substances which have been used in the refining of sugar or saccharine, and which are impregnated with saccharine matter, and char or burn such substances in a retort, kiln, or other suitable apparatus. A revolving retort, or a retort that is capable of revolving upon its longitudinal axis, or a retort of that kind and style that is known as a "screw retort," is suitable for use in and with this my invention. The color of the product varies according to the degree or extent of charring or burning. A perfect charring produces a dense black, while after a partial charring the material has the color of umber. The black may be rendered more dense by mixing with the substance before charring a small proportion—say five per cent.—of blood or other nitrogenous substance. This charred material is extremely useful for many purposes. It may, for example, be employed in the manufacture of blacking or paint, furnishing, as it does, an excellent black pigment, much more easily ground and mixed than bone-black and much cheaper than bone-black, though in many respects of a similar character. When ground and levigated, it is suitable for manufacturing into printing and engraving inks, drop-blacks, black varnish, paper staining, coating for tarpaulins, &c. It also constitutes a good foundry carbon, and is very useful as a disinfectant and as a fertilizer, as also for filtration purposes.

My improved char is permanent and unalterable and will withstand acids, and from the fact that it is more easily ground and mixed than common bone-black it is rendered more useful and valuable than the latter.

Though I have mentioned the substances which have been used in the refining of sugar or saccharine; which substances are now practically refuse material and almost, if not altogether, wasted, yet in the method of procedure by which I produce my improved char I may impregnate calcareous or earthy substances which have not been in any way previously used, and treat them as hereinbefore described.

Having thus described my invention, what I claim is—

As an article of manufacture, a char possessing the characteristics and adapted for the uses described, and composed of calcareous earthy substances, as chalk, impregnated with saccharine matter, and particularly the earthy refuse of sugar-refineries, calcined or burned, substantially as set forth.

In testimony whereof I have hereunto signed my name in the presence of two subscribing witnesses.

A. G. WASS.

Witnesses:
CLINTON LOVELL,
J. T. KNOWLES.